United States Patent

[11] 3,569,835

[72] Inventor Robert H. Harner
Park Ridge, Ill.
[21] Appl. No. 700,275
[22] Filed Jan. 24, 1968
[45] Patented Mar. 9, 1971
[45] Assignee S & C Electric Company, Chicago, Ill.

[54] CRYSTAL CONTROLLED RADIO RECEIVER FOR HIGH VOLTAGE ALTERNATING CURRENT SENSING USING FREQUENCY MODULATION WITH AUTOMATIC FREQUENCY AND OUTPUT CONTROL
15 Claims, 3 Drawing Figs.

[52] U.S. Cl. ........................................................ 325/63,
317/36, 317/60, 324/96, 325/113, 325/363, 340/201, 340/207, 340/224, 340/310, 343/225
[51] Int. Cl. ........................................................ H02h 7/26
[50] Field of Search ............................................ 325/25, 63, 101, 102, 113, 119, 394, 395, 416, 418, 423; 340/201, 207, 224, 310; 324/117, 127; 329/136, 178, 179; 325/67, 363, 364, 430, 484, 392; 317/14, 27, 36, 60; 343/225; 324/96

[56] References Cited

UNITED STATES PATENTS

| | | | |
|---|---|---|---|
| 3,195,059 | 7/1965 | Adams | 329/136 |
| 3,197,702 | 7/1965 | Schweitzer | 325/113 |
| 3,275,892 | 9/1966 | Schweitzer | 325/113 |
| 3,297,913 | 1/1967 | Schweitzer | 325/113 |
| 3,428,896 | 2/1969 | Schweitzer | 325/119 |
| 3,453,544 | 7/1969 | Schweitzer | 325/113 |
| 3,460,042 | 8/1969 | Harmer | 325/67 |

*Primary Examiner*—Richard Murray
*Assistant Examiner*—Albert J. Mayer
*Attorney*—Robert R. Lockwood

ABSTRACT: A radio receiver adjusts its center frequency according to the center frequency differential between the receiver and associated transmitter, maintains the correction for a time after transmission ceases, opens the circuit to the load driven by the receiver and grounds the load circuit.

PATENTED MAR 9 1971 3,569,835

SHEET 2 OF 3

Figure 1:
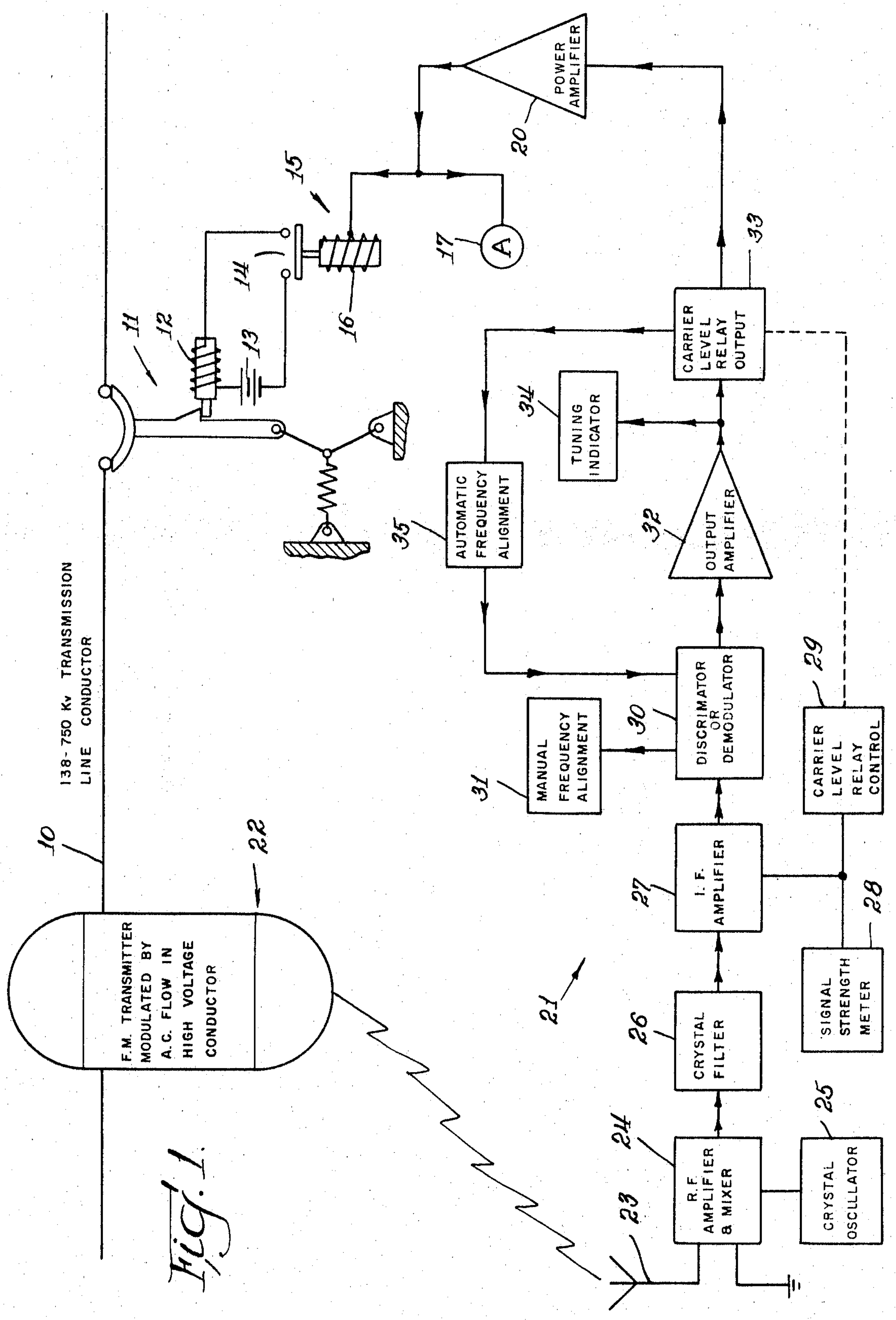

CRYSTAL CONTROLLED RADIO RECEIVER FOR HIGH VOLTAGE ALTERNATING CURRENT SENSING USING FREQUENCY MODULATION WITH AUTOMATIC FREQUENCY AND OUTPUT CONTROL

This invention is an improvement over the disclosure in Harner application Ser. No. 498,696, filed Oct. 20, 1965, U.S. Pat. No. 3,460,042, issued Aug. 5, 1969.

Among the objects of this invention are: To provide for shifting the center frequency of a radio receiver according to the center frequency differential between the receiver and its transmitter; to employ for this purpose a direct voltage component of the output of the receiver which is a function of this differential by applying it to an automatic frequency alignment circuit which, in turn, applies a counterpart voltage to the demodulating circuit or discriminator of the receiver to change its center frequency; to increase the gain in the automatic frequency alignment circuit as the direct voltage component decreases; to maintain the corrective action of the automatic frequency alignment circuit for a substantial time after the transmitter ceases to function in order to minimize the transient effect in the receiver output on reenergization of the transmitter; after expiration of this time to restore the automatic frequency alignment circuit to its inactive condition corresponding to no differential between the transmitter and receiver; to disconnect the receiver from its load and form the automatic frequency alignment circuit when the transmitter is deenergized and to ground the load circuit; to connect the receiver to the load and to the automatic frequency alignment circuit only when a signal of proper frequency and magnitude is received; to disconnect the automatic frequency alignment circuit if no signal is received so that the receiver will not shift to an adjacent channel; to limit the control range of the automatic frequency alignment circuit to prevent capture by a strong adjacent channel; and to reduce the output of the system to zero when the transmitter turns off or the transmitter or the receiver fails.

According to this invention a receiver is arranged to accommodate shift in the carrier frequency of the associated transmitter that is mounted on and is modulated, for example, by current flow in a conductor of a high voltage electric power transmission line. The shift of frequency in the transmitter may be caused by change in ambient temperature resulting in change of those components in the transmitter that generate and control its carrier frequency. A shift also may be caused by aging of the transmitter components. In the receiver a local oscillation is generated having a frequency that beats with the frequency received from the transmitter to generate an intermediate frequency which carries the signal that represents the current flow in the conductor. This intermediate frequency is demodulated by a tunable discriminator or demodulator. When the center frequency of the discriminator or demodulator is equal to the arithmetic difference between the transmitter carrier frequency and the local oscillator frequency, the receiver is said, by way of definition, to have a center frequency equal to the center frequency of the transmitter carrier. Since the receiver is located at ground potential, the frequency of its local oscillator can be controlled so as to remain substantially constant. Thus the receiver center frequency can remain constant while the transmitter center frequency may shift with the result that the output of the receiver, in addition to containing the wanted signal, also includes a direct voltage component the magnitude of which is a function of the center frequency differential between the transmitter and receiver frequencies. The center frequency differential between the transmitter and receiver appears as a DC output from the receiver since the system is DC coupled. When the transmitter is turned on or off under these conditions, a transient output results which could be mistakenly identified as a primary fault current by output devices such as relays or oscillographs. This type of output is undesirable and is essentially eliminated by an automatic frequency alignment circuit. The unwanted direct voltage component is reduced to a minimal valve by applying it to an automatic frequency alignment circuit which is arranged to apply a counterpart direct voltage to the demodulating circuit or discriminator in order to shift its center frequency, by definition the receiver center frequency, in the direction of the transmitter frequency to the end that the center frequency differential is minimized. The automatic frequency alignment circuit includes a feedback loop which increases its gain as the differential is reduced in order to effect the desired control as the differential approaches the minimum value. The direct voltage component which corresponds to the frequency differential is applied to a storage capacitor that forms a part of the automatic frequency alignment circuit. The charge on the capacitor maintains the receiver center frequency at its corrected level for a predetermined time after the transmitter ceases to transmit in the expectation that it will begin to transmit again within this period and at the previous center frequency. A relay is arranged to be controlled in response to receipt of the transmitter frequency. Upon loss of the transmitter signal, the relay is deenergized and certain of its contacts open the output circuit of the receiver to the load which it drives in order to avoid the application of receiver output noise to the load which would cause false operation of relays, etc. Contacts of the relay also open the circuit to the storage capacitor in the automatic frequency alignment circuit on termination of the transmitter signal to prevent receiver output noise from changing the receiver center frequency and to avoid capture of the receiver by a strong adjacent channel. Contacts also are provided on the relay to energize an indicator which shows that the frequency is being received from the transmitter. Other contacts on its relay are used to ground the input to the load in order to avoid false operation of meters and relays which might occur if the circuit to the load is suddenly open circuited. Energy stored in the input circuits may transient signals.

Figure 2A:
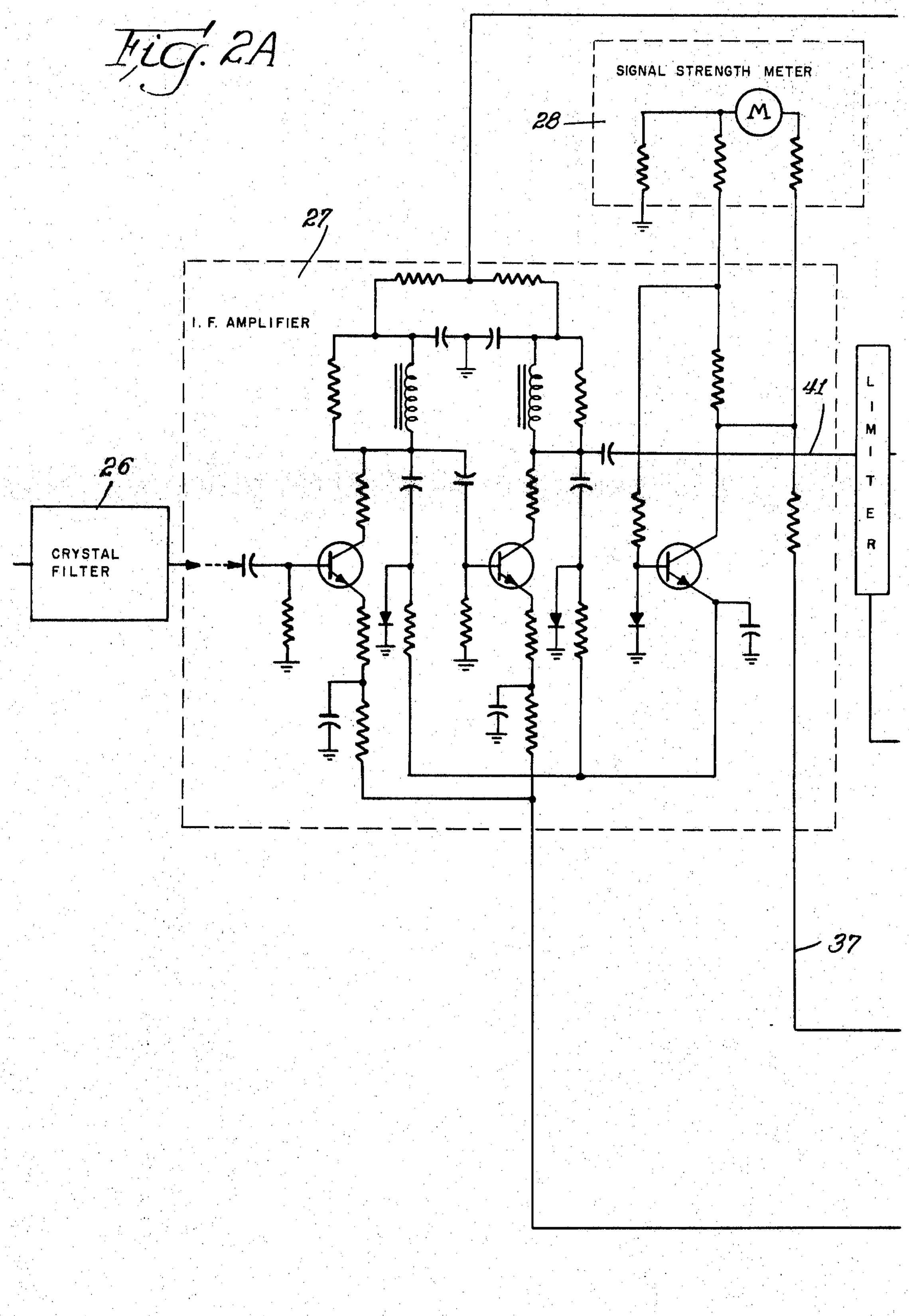
Figure 2B:
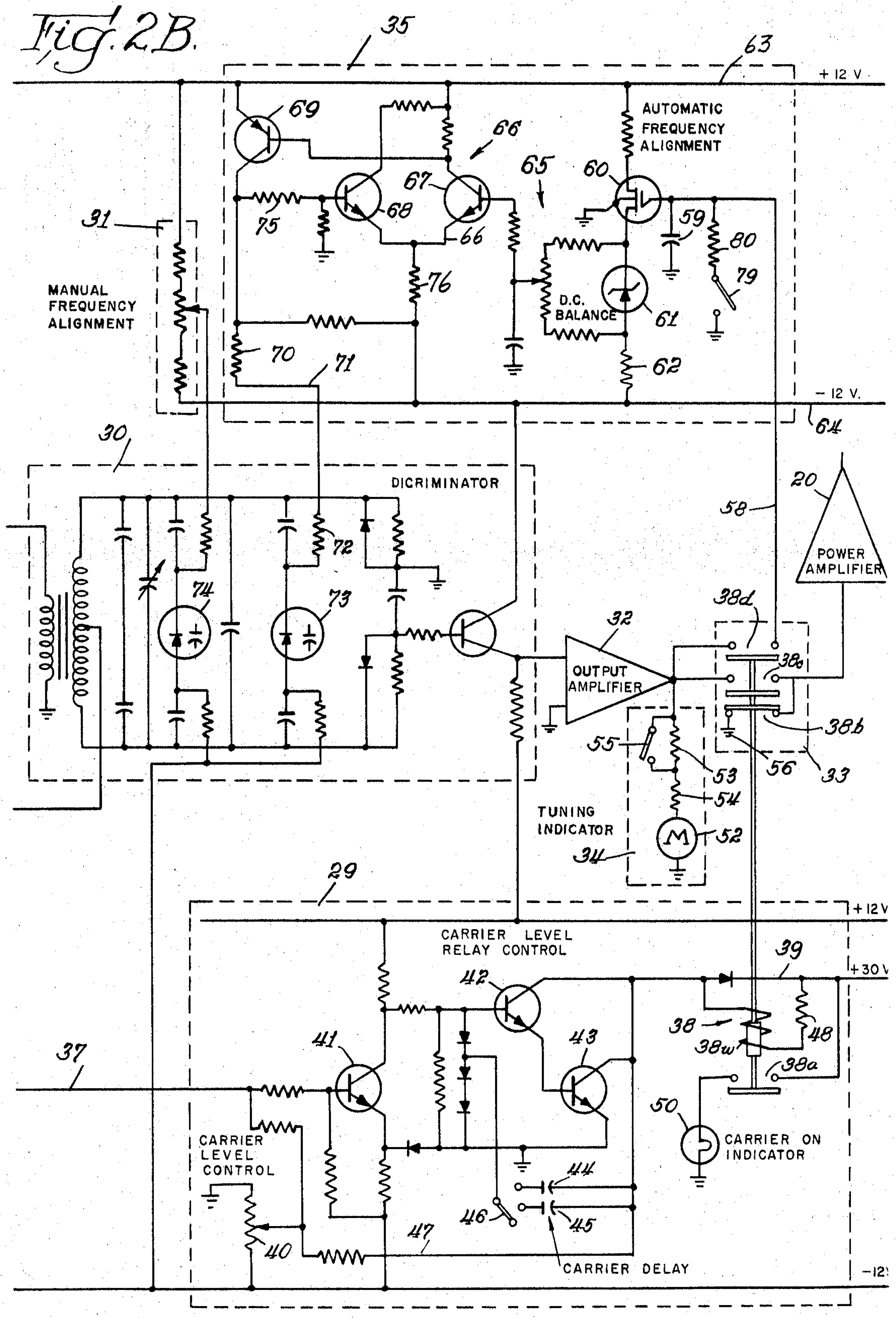

In the drawings: FIG. 1 is a schematic representation of a transmitter-receiver circuit for use in conjunction with a conductor of a high voltage electric power transmission line. FIGS. 2A and 2B, placed side by side in the order mentioned, show certain of the circuit connections in the receiver employed in the system shown in FIG. 1.

In FIG. 1 the reference three-phase 10 designates one conductor of what may be a three-phase high voltage 60 Hz alternating current electric power transmission line. The conductor 10 may be energized, as indicated, at voltages for example ranging from 138 to 750 Kv. Interposed in the conductor 10 is a circuit interrupter that is indicated, generally, at 11. It includes a trip coil 12 that is arranged to be energized from a battery 13 on closure of contacts 14 of relay that is indicated, generally, at 15 and has an operating winding 16. The operating winding 16 can be energized along with the energization of a current responsive meter 17 which may be an ammeter or the current element of a watt meter device. The operating winding 16 and meter 17 are arranged to be energized from a power amplifier 20 that is driven by an FM radio receiver which is indicated, generally, at 21. The radio reciever 21 is arranged to receive the output of an FM radio transmitter, indicated generally at 22, which is mounted on the line conductor 10, operates at its potential, and has its transmitter or carrier frequency modulated by the current flow in the conductor 10.

The modulated transmitter frequency or carrier frequency is received by antenna 23 of the radio receiver 21 and is first applied to an RF amplifier and mixer 24 which operates in conjunction with a local crystal oscillator 25 that is arranged to generate a frequency that beats with the transmitter or carrier frequency in the amplifier and mixer 24. The resulting intermediate frequency is passed through a crystal filter 26 into an IF amplifier 27 which has associated therewith a signal strength meter 28 and a carrier level relay control circuit 29. The intermediate frequency carrying the signal which corresponds to the flow of alternating current in the conductor 10 is applied to a discriminator or demodulator 30 which has associated therewith a manual frequency alignment circuit 31 that is employed for manually adjusting its center frequency which, by definition, is referred to herein as the receiver center frequency. The signal obtained through the discriminator or demodulator 30 is amplified by output amplifier 32 and is applied through carrier level relay output circuit 33 to the power amplifier 20. A tuning indicator 34 is associated with the output of the amplifier 32 for indicating the difference, if any, between the center frequency of the carrier and the center frequency of the receiver. In order to minimize the differential between the transmitter or carrier frequency and the receiver center frequency, an automatic frequency alignment circuit 35 is arranged to control the center frequency of the discriminator or demodulator 30 in a manner to be described.

It is preferable to adjust the frequency of the discriminator or demodulator 30 in accordance with the center frequency differential rather than the frequency of the oscillator 25. Since a fixed frequency oscillator, such as the oscillator 25, is inherently more stable that a tunable oscillator, greater overall stability is achieved by varying the center frequency of the discriminator or demodulator 30. For the purpose described, however, the local oscillator frequency could be varied.

Referring to FIGS. 2A and 2B it will be noted that a conductor 37 interconnects the IF amplifier 27 with the carrier level relay control circuit 29 for the purpose of energizing through the circuitry therein a carrier level relay that is indicated, generally, at 38. It has an operating winding 38*w* that is connected for energization to a conductor 39 which is energized, for example, at +30 volts above ground. The carrier level relay 38 includes normally open contacts 38*a*, normally closed contacts 38*b* and normally open contacts 38*c* and 38*d*.

A DC output of the IF amplifier 27 is proportional to the carrier field strength level at the receiving antenna 23 from the transmitter 22. It is desirable not to connect the output of the receiver 21 to the output equipment, including the power amplifier 20, until the received signal is at a predetermined level representing normal operation of the transmitter 22. In the carrier level relay control circuit 29 there is provided a carrier level control potentiometer 40 which is set at a level such that the winding 38*w* of the carrier level relay 38 is not energized until the DC output of the IF amplifier 27 is equivalent to the desired field strength level at the receiving antenna 23 from the transmitter 22. When the input voltage to transistor 41 reaches the level preset by the potentiometer 40, the input to transistor 42 is such as to cause switching of transistors 42 and 43 and energization of winding 38*w* of the carrier level relay 38. Time delay is introduced in the energization of winding 38*w* by the provision of capacitors 44 and 45 which are connected in the circuit by a switch 46. In some applications delay is required to allow the transmitter carrier to stabilize before energizing the output equipment including the amplifier 20. Positive feedback conductor 47 is utilized to produce a hysteresis in the "on" and "off" response level of the carrier level relay 38. It is desirable to allow the carrier field strength to fall below the "turn-on" level before deenergizing the winding 38*w* of the carrier level relay 38 so that small changes in the carrier field strength will not cause chattering of relay 38. The time constants of capacitors 44 and 45 and resistor 48 in series with winding 38*w* and the collector to emitter resistance of transistor 43 provide approximately a O to 4 millisecond delay.

On energization of the carrier level relay 38 its contacts 38*a* are closed to complete an energizing circuit for an indicating lamp 50 which shows by being lighted that the transmitter or carrier frequency is being received.

Any difference between the center frequencies of the transmitter or carrier frequency and the receiver frequency (by definition the frequency of the discriminator or demodulator 30) appears as a direct voltage component in the output of the amplifier 32. In order to indicate the relation between transmitter and receiver center frequencies, the tuning indicator 34 is employed. It includes an indicating meter 52 which is connected in series circuit relation to the output of the amplifier 32 through resistors 53 and 54. A range switch 55 is provided to short circuit resistor 53 in order to change the range in which the meter 52 operates.

A further result of the energization of the carrier level relay 38 is to close contacts 38*c* which connect the output amplifier 32 to the power amplifier 20 which constitutes load circuit means for the radio receiver 21. As soon as operation of the transmitter 22 ceases, it is desirable to avoid the application of any transient signal to the power amplifier 20 to avoid false operation of relays, etc., driven by the power amplifier 20. Accordingly, not only is the circuit thereto opened at contacts 38*c* on deenergization of the carrier level relay 38, but also at contacts 38*b* the load circuit including the power amplifier 20 is grounded at 56 to prevent false relay operation.

It is undesirable to have any differential between the center frequency of the transmitter or carrier frequency and the center frequency of the receiver frequency. As pointed out, this differential is reflected in the direct voltage component of the output of output amplifier 32 and can be measured by tuning indicator 34 employing the meter 52. In accordance with this invention provision is made for employing this direct voltage component for changing the center frequency at which the discriminator or demodulator 30 functions. Its center frequency is changed in the direction of the center frequency of the transmitter or carrier frequency since the frequency of the local oscillations, as determined by the crystal oscillator 25, can be controlled in such manner as to remain substantially constant.

On energization of the carrier level relay 38, a circuit is completed at contacts 38*d* over conductor 58 for applying the direct voltage component, if any, to a storage capacitor 59 which is charged to an extent, depending upon the magnitude of the direct voltage component. The charge on the storage capacitor 59 is applied to the base of a field effect transistor 60 which has a relatively high impedance. The field effect transistor 60 is connected through a zener diode 61 and a resistor 62 across conductors 63 and 64 which, as indicated, are energized at +12 volts above and −12 volts below ground. It will be understood that these and other voltages specifically referred to herein can be varied and that mention thereof is for illustrative purposes only. The arrangement is such that, on reduction in the flow of current in conductor 10 to a value such that the transmitter 22 is no longer operative, the storage capacitor 59 is discharged slowly and a substantial time is required for this to take place.

The output of the circuits including the field effect transistor 60 is applied by a potentiometer 65, which is connected across the zener diode 61, to control the operation of a feedback amplifier 66 which includes a pair of transistors 67 and 68 and an output transistor 69. A direct voltage, which is a counterpart of the direct voltage applied to the storage capacitor 59, is applied by the output transistor 69 through resistor 70, conductor 71 and resistor 72 to a varactor 73 in the discriminator or demodulator 30. The capacitance of varactor 73 is changed as a function of the magnitude of this counterpart direct voltage to change the center frequency of the discriminator or demodulator 30. For aligning the transmitter 22 and the receiver 21 on installation, the manual frequency alignment circuit 31 in a similar manner controls the capacitance of a varactor 74 in the discriminator or demodulator 30.

The reason for employing the feedback amplifier 66 is to increase the gain of the automatic frequency alignment loop as the charge on the storage capacitor 59 decreases. This is necessary in order to drive the center frequency of the discriminator or demodulator 30 in the direction of the center frequency of the transmitter or carrier frequency to reduce the frequency differential to a minimal value. For this purpose a portion of the output from transistor 69 is applied through resistor 75 to the base of transistor 68. This voltage is reflected in a change in the voltage across resistor 76 and thereby changes the effective gain of transistor 67.

The charge on the storage capacitor 59 can be manually reduced to zero by operation of a capacitor discharge switch 79 which, when closed, allows the storage capacitor 49 to discharge through a discharge resistor 80 and reduces the correction to zero.

As long as the center frequency of the discriminator or demodulator 30 or the receiver frequency is properly aligned with the center frequency of the transmitter or carrier frequency, no direct voltage component appears from the output of amplifier 32. When there is a difference in these center frequencies, which reflects a differential between the transmitter or carrier frequency and the receiver frequency, the direct voltage component appears and it charges the storage capacitor 59. The feedback amplifier 66 then functions in the manner described to reduce the differential to a minimum or until the available error which is reflected by the magnitude of the direct voltage component from the amplifier 32 is below a certain minimum value at which no further correction can be obtained. The maximum tuning range of the discriminator or demodulator 30 is approximately ±20kHz. and it is essentially symmetrical about 0, The characteristics of the automatic frequency alignment circuit 35 are such that the maximum residual direct voltage output from the amplifier 32 is approximately 40 db. below the maximum output level of the receiver 21. The response time for correcting the frequency of the discriminator or demodulator 30 is relatively slow in order that the correction will be unaffected by the 60 Hz signal from the output amplifier 32 which corresponds to the 60 Hz current in the high voltage conductor 10. Specifically, the effective frequency of the slowly decaying counterpart direct voltage applied to the varactor 73 is such that it will not pass through the amplifier 32. The initial correction rate is approximately 1 kHz/sec yielding, for example, a minimum correction time of 10 seconds for a 10 kHz. frequency differential.

The relationship between the capacitance of the storage capacitor 59 and the discharge circuit therefor including the field effect transistor 60 is such that upon loss of the transmitter or carrier frequency due to deenergization of the radio transmitter 22, the automatic frequency alignment circuit 35 maintains the center frequency of the discriminator or demodulator 30 at the corrected level for a minimum period of the order of 60 minutes. For temporary power system outages due to switching or fault interruption, this time period of 60 minutes is adequate so that, when the radio transmitter 22 is reenergized, the center frequency differential will be minimal and the resultant system output transient will be negligible.

It will be understood that the circuits disclosed herein are typical of those that can be employed for the purposes above outlined and that other circuits can be used to operates as described herein.

I claim:

1. In a radio receiver responsive to a radio transmitter mounted on a high voltage electric power transmission line conductor and generating a transmitter carrier modulated by a signal corresponding to a variable in said conductor and likely to change its center frequency in combination:

a receiver oscillator for generating a local oscillation having a frequency which is maintained substantially constant and beats with said transmitter carrier to generate an intermediate frequency;

demodulating circuit means for receiving said intermediate frequency and tunable to operate at a receiver frequency, the output of said demodulating circuit means including a direct voltage component corresponding to the differential between the transmitter carrier and receiver center frequencies;

automatic frequency alignment means responsive to said direct voltage component for applying to said demodulating circuit means a counterpart direct voltage component to shift the center frequency of said demodulating circuit means in the direction of said center frequency of said carrier, and capacitor means connected to said demodulating circuit means and charged to an extent depending upon the magnitude of said direct voltage component for maintaining said automatic frequency alignment means in operation to shift said center frequency of said demodulating circuit means for a substantial time after said transmitter ceases to operate.

2. The radio receiver according to claim 1 wherein means discharge said capacitor means a substantial time after removal therefrom of said direct voltage component whereby said counterpart direct voltage applied to said demodulating circuit is correspondingly reduced.

3. The radio receiver according to claim 1 wherein feedback circuit means in said automatic frequency alignment means increases the gain thereof with decrease in said direct voltage component to maintain said counterpart voltage at the required voltage.

4. The radio receiver according to claim 1 wherein said variable is 60 Hz current and said automatic frequency alignment means is substantially nonresponsive to that portion of said signal corresponding to 60 Hz.

5. The radio receiver according to claim 1 wherein said demodulating circuit means is characterized by having a tuning range of about ± 20 kHz. to prevent response of said receiver to an adjacent channel.

6. Means for transmitting a signal corresponding to the magnitude of a variable at the potential of a high voltage conductor and for receiving said signal at a remote point at ground potential comprising:

a radio transmitter for operating at said potential of said conductor to generate a transmitter carrier frequency modulated by a signal corresponding to a variable in said conductor;

a radio receiver at said remote point responsive to said signal modulated transmitter carrier frequency including:

a receiver oscillator for generating a local oscillation having a frequency which is maintained substantially constant and beats with said transmitter carrier frequency to generate an intermediate frequency;

intermediate frequency amplifier means for said intermediate frequency;

demodulating circuit means for receiving said intermediate frequency and tunable to operate at a receiver frequency, the output of said demodulating circuit means including a direct voltage component corresponding to the differential between the transmitter carrier and receiver center frequencies;

carrier level relay means coupled to said intermediate frequency amplifier means and responsive to receipt of said modulated transmitter carrier frequency; and automatic frequency alignment means controlled by said carrier level relay means and responsive to said direct voltage component for applying to said demodulating circuit means a counterpart direct voltage component to shift the center frequency of said demodulating circuit means in the direction of said center frequency of said transmitter carrier frequency.

7. The radio receiver according to claim 6 wherein relay control circuit means, responsive to said modulated transmitter carrier, control the energization of said relay means, and means control the level at which said relay control circuit means is responsive to said modulated transmitter carrier.

8. The radio receiver according to claim 6 wherein means delay energization of said relay means for a predetermined time after said modulated transmitter carrier reaches a predetermined level.

9. The radio receiver according to claim 6 wherein means cause said relay means to become deenergized when the level of said modulated transmitter carrier is reduced a predetermined amount below the level at which said relay means is energized.

10. The transmitting and receiving means according to claim 6 wherein:

signal responsive means is driven in accordance with the output of said demodulating circuit means; and said relay means includes means for connecting said demodulating circuit means to said signal responsive means when said relay means is energized in response to said modulated transmitter carrier and also includes means for connecting said signal responsive means to ground when said relay means is deenergized.

11. In a radio receiver responsive to a radio transmitter mounted on a high voltage electric power transmission line conductor and generating a transmitter carrier modulated by a signal corresponding to current flow in said conductor and likely to change its center frequency, in combination:

a receiver oscillator for generating a local oscillation having a frequency which is maintained substantially constant and beats with said transmitter carrier to generate an intermediate frequency;

intermediate frequency amplifier means for said intermediate frequency;

demodulating circuit means for receiving the amplified intermediate frequency and tunable to operate at a receiver frequency, the output of said demodulating circuit means including a direct voltage component corresponding to the differential between the transmitter carrier and receiver center frequencies;

automatic frequency alignment means responsive to said direct voltage component for applying to said demodulating circuit means a counterpart direct voltage component to shift the center frequency of said demodulating circuit means in the direction of said center frequency of said carrier; and carrier level relay means coupled to said intermediate frequency amplifier means and responsive to said transmitter carrier for controlling the application of said direct voltage component to said automatic frequency alignment means.

12. The radio receiver according to claim 11 wherein relay control means, responsive to said modulated transmitter carrier, control the energization of said relay means, and means control the level at which said relay control circuit means is responsive to said modulated transmitter carrier.

13. The radio receiver according to claim 11 wherein means delay energization of said relay means for a predetermined time after said modulated transmitter carrier reaches a predetermined level.

14. The radio receiver according to claim 11 wherein means cause said relay means to become deenergized when the level of said modulated transmitter carrier is reduced a predetermined amount below the level at which said relay means is energized.

15. The radio receiver according to claim 11 wherein said carrier level relay means includes means for connecting said demodulating circuit means to signal responsive means when said relay means is energized in response to said modulated transmitter carrier frequency and also includes means for connecting said signal responsive means to ground when said relay means is deenergized.